United States Patent
Gunderson et al.

(10) Patent No.: US 7,617,994 B2
(45) Date of Patent: Nov. 17, 2009

(54) WORKING SPACE ENCLOSURE FOR UNDERGROUND SPRINKLER HEADS

(76) Inventors: William K. Gunderson, 3020 W. Spencer St. #G-96, Appleton, WI (US) 54914; Lyle D. Ungerecht, 915 Union St., Beaumont, CA (US) 92223

( * ) Notice: Subject to any disclaimer, the term of this patent is extended or adjusted under 35 U.S.C. 154(b) by 0 days.

(21) Appl. No.: 12/128,519

(22) Filed: May 28, 2008

(65) Prior Publication Data
US 2008/0302883 A1    Dec. 11, 2008

Related U.S. Application Data

(60) Provisional application No. 60/942,541, filed on Jun. 7, 2007.

(51) Int. Cl.
*B05B 1/28* (2006.01)
(52) U.S. Cl. .............. 239/288.5; 239/201; 239/203; 239/206; 239/207; 239/237; 239/288; 137/363; 137/377
(58) Field of Classification Search ......... 239/201–206, 239/225.1, 237–242, 288, 288.3, 288.5, 207; 137/363, 364, 377
See application file for complete search history.

(56) References Cited

U.S. PATENT DOCUMENTS

| | | | |
|---|---|---|---|
| 3,265,310 A * | 8/1966 | Cohen ................. | 239/201 |
| 3,929,288 A * | 12/1975 | Brusadin et al. ......... | 239/288.5 |
| 4,145,003 A | 3/1979 | Harrison et al. | |
| 4,429,832 A | 2/1984 | Sheets | |
| 5,137,307 A | 8/1992 | Kinsey | |
| 5,213,262 A | 5/1993 | Violette | |
| 5,292,071 A * | 3/1994 | Kruer .................. | 239/242 |
| 5,772,118 A | 6/1998 | Fabiano | |
| 5,938,121 A | 8/1999 | Ferguson et al. | |
| 6,439,476 B1 | 8/2002 | Boggs | |
| 6,494,386 B1 | 12/2002 | Banu | |
| 6,764,025 B1 * | 7/2004 | Espina .................. | 239/288 |
| 2007/0063067 A1 | 3/2007 | Keeney | |

* cited by examiner

*Primary Examiner*—Steven J Ganey
(74) *Attorney, Agent, or Firm*—Procopio, Cory, Hargreaves & Savitch, LLP; Lisel M. Ferguson

(57) ABSTRACT

A sprinkler head housing for allowing access to sprinkler heads and shafts for maintenance and repair. More particularly, the present invention relates to a device which allows for, and encloses, a working space around underground sprinkler heads. The device is placed around a sprinkler shaft in the ground and the plant material is placed on its outside. The top of the sprinkler head sits above the device. When the sprinkler needs to be accessed, the top of the device can be removed and an open interior space remains where a user can place his/her hands and/or tools to repair or replace a sprinkler head. This invention may be installed when the underground sprinkler system itself is first installed or alternatively may be installed at each sprinkler head as needed.

17 Claims, 4 Drawing Sheets

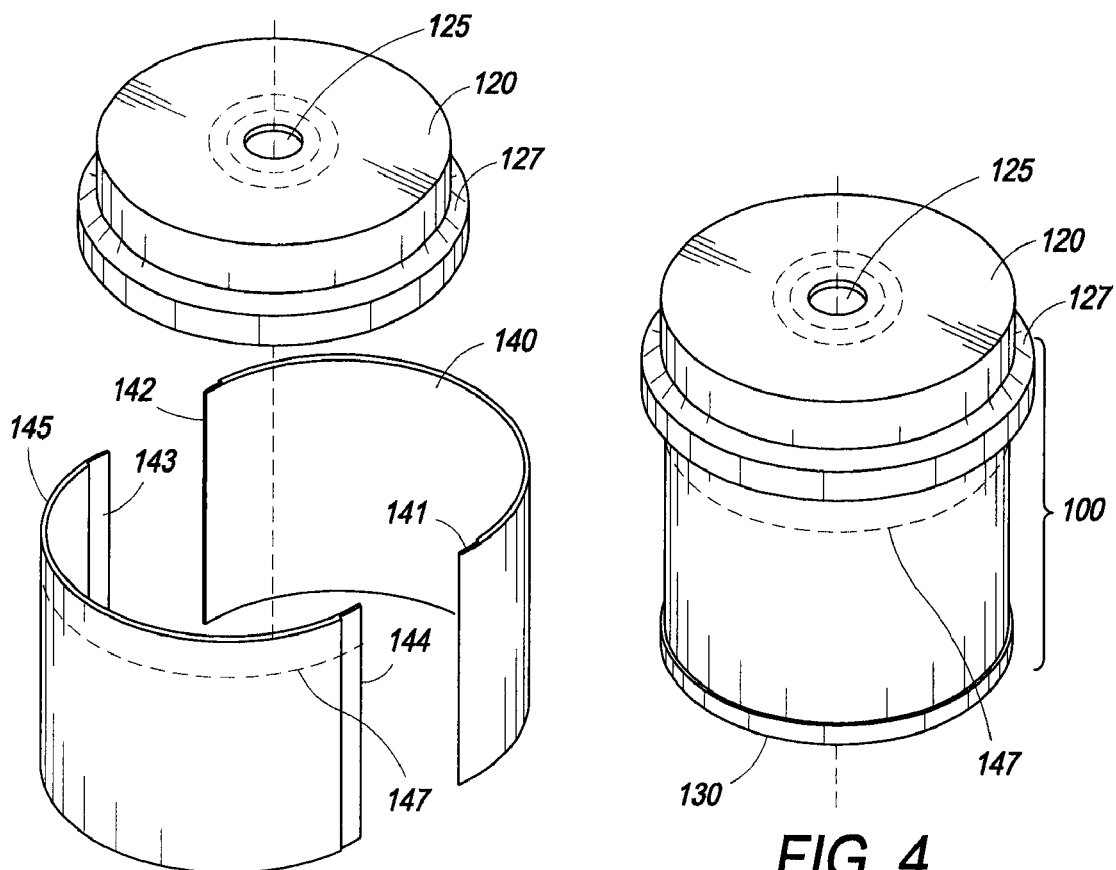
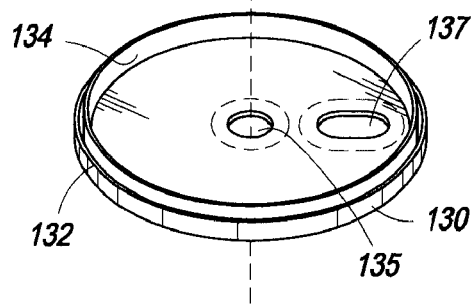
FIG. 3
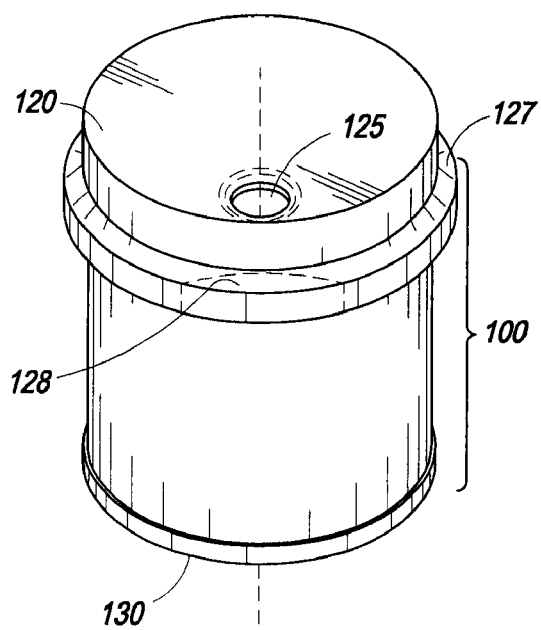
FIG. 4
FIG. 5
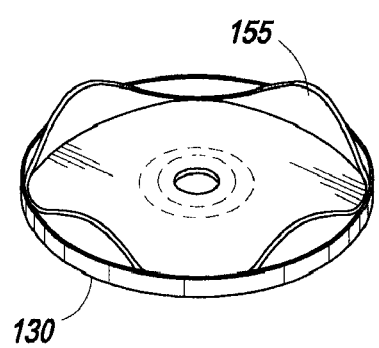
FIG. 6

WORKING SPACE ENCLOSURE FOR UNDERGROUND SPRINKLER HEADS

CROSS-REFERENCE TO RELATED APPLICATIONS

This application claims the benefit of U.S. Provisional Patent Applications Ser. No. 60/942,541, filed Jun. 7, 2007, entitled "Working Space Enclosure for Underground Sprinkler Heads" which is hereby incorporated by reference in its entirety.

FIELD OF THE INVENTION

The present invention relates, in general, to a device and a method for allowing access to underground sprinkler heads for maintenance and repair. More particularly, the present invention relates to a device which allows for, and encloses, a working space around underground sprinkler heads. This device enables a user to place his/her hands and/or tools in the working space to repair or replace a sprinkler head. This invention may be installed when the underground sprinkler system itself is first installed or alternatively may be installed at each sprinkler head as needed.

BACKGROUND OF THE INVENTION

In order to adequately provide water to lawns or other planting beds, sprinkler systems are commonly installed. Most underground sprinkler systems are composed of multiple sprinkler heads linked together with pipes and/or water lines which carry the water from an outflow valve. One of the major drawbacks to such a sprinkler system is that once a sprinkler head is damaged it is difficult to repair. Furthermore, if one head is damaged the water gushes out (the "geyser" phenomenon) of the system often causing flooding in the area and depriving water pressure to sprinkler heads down the line from the geyser. This causes a useless waste of water and can be very damaging to the surrounding vegetation and infrastructure. It is most beneficial to repair the heads as soon as possible. Sprinkler heads become damaged or otherwise malfunction for many reasons. A few examples are as follows: striking by lawnmowers, clogging with dirt and debris, vegetation overgrowing a head necessitating that it be raised, and cracked risers.

Currently when a sprinkler head requires maintenance, a working space of approximately one foot in diameter must be dug in the dirt around the base of the sprinkler head, usually all the way down to where they screw into the riser or water supply line. This is a very messy and time consuming job, especially when the soil is rocky or contains roots which must be cut. When the bottom of the head and/or connection with the underground pipe are finally reached and unscrewed, the hole that has just been dug usually fills with water that is residual in the underground water supply lines, even if the main water source has been shut down. Muddy water, dirt and debris fall into the now open water lines. Since the debris will likely clog the replaced head and/or water line if allowed to remain, the water must be bailed out of the hole or one must wait for the water to be absorbed back into the ground before work can be continued or completed.

After the repair is made, the hole that is dug must be refilled with dirt. It is most aggravating when this procedure must be done all over again a short time later to repair another problem that might occur with the same head. When this scenario is multiplied by 35 to 60 sprinkler heads per yard this becomes a never-ending problem.

There is, thus, a need to resolve this problem with a method and device that provides for and maintains a clean and clear working space in the ground surrounding the sprinkler heads.

SUMMARY OF THE INVENTION

This invention involves a device and method for maintaining an open and clean working space in the ground surrounding the sprinkler heads so that repairs and maintenance can be easily made. This device can be installed either at the time the sprinkler system is placed in the ground or at a later time when the repair of a sprinkler head must be done. This device fits around each sprinkler head and creates a space large enough for a user to fit his/her hands into and/or to utilize tools in the hole to repair the sprinkler head, riser or other connection to the underground pipe. Once the device is installed dirt is filled in around the outside of the cylinder assembly and real or artificial turf is placed over the top cap.

After the device is installed it then becomes easy to reach the portion of the sprinkler that is below ground by removal of the top turf and removal of the cap. When the cap is removed there is a clear working area all the way down to the water supply pipe large enough to accommodate a person's hand or tools. The sprinkler head is easily unscrewed, repaired and replaced. Once the repair is complete the top cap is put back onto the device, the sprinkler head is screwed back in, and the turf is replaced over the cap. This device and method avoids digging, dirt, muddy filled hole, tree roots and rocks. Even if evacuated water spills into the cylinder when the head is removed it is at least clean and can easily be suctioned out with a simple turkey baster if desired. Work can be continued without waiting for the water to be absorbed back into the ground.

The sprinkler working space device is comprised of two cylinder halves and a top cap and a bottom cap. When the cylinder halves are mated, together they form a complete cylinder of approximately four and a half inches in diameter forming the body of the device. In a preferred embodiment these halves are manufactured with plastic, however many other hard substances could be used as the material for these halves. The halves mate together at each of their edges. The configuration of the cylinder with two halves solves several problems. This configuration enables the device to be more easily shipped, stocked and displayed on retailer shelves. In a preferred embodiment the cylinder halves are extrusions of approximately four feet in length. The extrusion is designed such that when two sections of equal length cut from the extrusion are properly positioned in relationship to each other, they mate flushly to form a complete cylinder.

A top and bottom cap fit onto the cylinder. Each the top and bottom cap have an exterior and interior side. The top and bottom cap are formed with two concentric upright walls on their interior side running the circumference of the cap at and near the outer perimeter of the cap disc. In the preferred embodiment the inner circumference cap wall can be manufactured to be slightly higher than the outer wall. The space between the concentric cap walls is designed to receive the ends of the cylinder halves and retain them in an upright position. In another preferred embodiment the inner wall of either cap can be scalloped, a design feature which makes it easier to install. In another preferred embodiment the top cap can be manufactured with a clear plastic, or other transparent hard material, which allows a better view when screwing the sprinkler head back onto the riser or other connection to the underground pipe. The preferred embodiment of the top cap incorporates a dirt guard that extends laterally and at a slight downward angle from the bottom of the outer wall around the complete circumference of the top cap.

Both the top and the bottom cap contain holes. The sprinkler head passes through a hole in the top cap and the water supply riser or other connection pipe passes through the bottom cap. The top and the bottom cap incorporate one or more concentric scored circles around the outside of the holes. The concentric scored circles allow the holes to be punched out or cut out at alternative locations. This provides options for the size and location of the holes depending on the type, size and location of sprinkler head (top cap) or water supply connection (bottom cap) which must pass through their surface.

There are alternate embodiments of the top caps which have the holes located in different areas of the surface. These alternate embodiments are necessary because sprinkler heads are not only located in open lawns but are often located along walkways and driveways. In the open areas, the holes in the top cap can be located in the center of the cap. Along walkways and driveways, however, the sprinkler heads are often too close to the pavement. When heads are close to the pavement the enclosure device may not fit when the center hole configuration is utilized. That's because the underground water supply pipes very often run extremely close to the pavement. In this case an embodiment of the device is used where the openings for the riser pipe and head is located closer to the outside edge of the cap's circumference.

BRIEF DESCRIPTION OF THE DRAWINGS

The accompanying drawings, which are incorporated in and constitute a part of the specification, illustrate embodiments of the invention, and together with the description, serve to explain the objects, advantages, and principles of the invention. In the drawings.

FIG. 3 is an expanded view of the working space enclosure of FIG. 2 showing the two cylinder halves and the bottom and top cap;

FIG. 4 is a perspective view of an embodiment of the working space device with the sprinkler head hole placed in the center and a dirt guard around the top cap;

FIG. 5 is a perspective view of an embodiment of the working space device with the sprinkler head hole offset to one side of the top cap and a dirt guard around the top cap;

FIG. 6 is an oblique view of an embodiment of a cap of a working space enclosure device cap with scalloped inner walls;

DETAILED DESCRIPTION OF PREFERRED EMBODIMENTS

After reading this description it will become apparent to one skilled in the art how to implement the invention in various alternative embodiments and alternative applications. However, all the various embodiments of the present invention will be described herein, it is understood that these embodiments are presented by way of an example only, and not limitation. As such, this detailed description of various alternative embodiments should not be construed to limit the scope or breadth of the present invention as set forth below.

Figure 1:
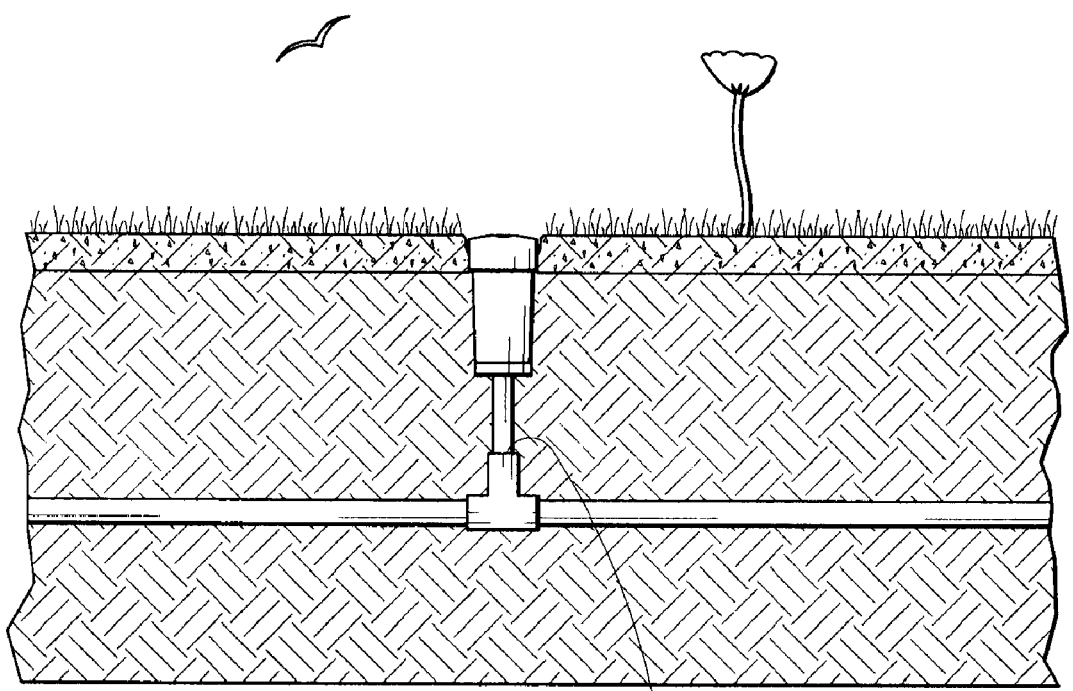
FIG. 1 is a cross-sectional view of an underground sprinkler installed in the ground with its connecting pipe, and without a working space enclosure installed.

With reference to FIG. 1 a cross sectional view of a standard sprinkler installed in the ground attached to an underground pipe is shown. As can be seen by viewing FIG. 1 in order to reach the connection between the sprinkler head and the underground pipe 50 the ground around the sprinkler head must be dug out and removed. This is an issue because the hole will likely fill with residual water from the water supply as soon as the sprinkler head is removed and the dirt surrounding the hole will likely erode into the hole.

Figure 2:
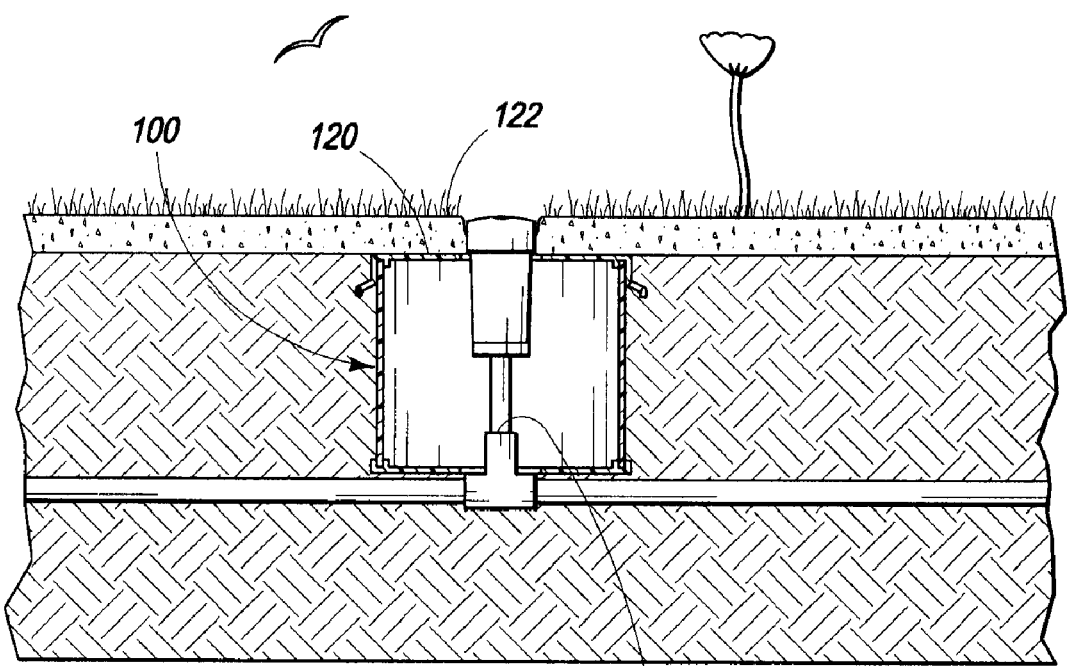
FIG. 2 is a cross-sectional view of an underground sprinkler installed in the ground with a working space enclosure installed.

FIG. 2 is a cross-sectional view of an underground sprinkler with a working space enclosure device 100 installed in the ground around a sprinkler head. As can be seen by viewing the FIG. 2 in order to access the connection between the sprinkler head and the underground pipe 50, just the upper portion of turf 122 and the top cap 120 of the device 100 must be removed. Once the top cap 120 is removed there is a large open space around the sprinkler head so that the connection 50 can be reached. If the area surrounding the sprinkler head fills up with water there is no surrounding dirt to muddy the water or fill the space. The space created around the sprinkler head is large enough so that the person repairing the head can fit their hands and/or tools into this space so that the repair or replacement can be comfortably completed.

FIG. 3 is an expanded view of the working space device 100 showing the two cylindrical halves (140 and 145) mated together and the bottom 130 and top cap 120. The body of the device is formed by two cylinder halves 140 and 145 which each form a half circle. When the two halves (140 and 145) are mated together the cylindrical body of the device is formed which has an upper and lower end. The halves 140 and 145 are manufactured of plastic or other rigid material and can be made at various heights. The thickness of the halves can range from 1/16 to 1/4 inch. In a preferred embodiment the body halves 140 and 145 are made from an extruded cylinder half which can range in length, which in turn can be cut into the desired length that determines the height of the cylinder. The halves are generally made at heights within the range of 4 to 12 inches. The extrusions are a continuous piece that can be manufactured at any length. Due to the design of the cylinder half extrusions, both halves of the cylinder are made from the same extrusion.

In one embodiment each of the halves has one or more scored lines 147 running its entire horizontal circumference starting at 1/2 to 1 inch down from the top edge. The scored lines 147 enable sections of the halves to be removed so that the body of the device can be made shorter at the scored lines. The adjustability of the device is beneficial in that the depth below ground at which the water supply pipes are installed varies to a great degree. Ideally, the top of the enclosure should be close to the surface of the ground. This requires that the wall heights of the working space enclosure should be adaptable to some degree. The ability to adjust the height of the device 100 enables the top to sit at the level that provides optimum performance.

The cylinder half extrusion has joggles on either of its edges. The two halves of the cylinder sides 140 and 145 are each constructed with complementary joggles 142 and 143, and 141 and 144 along the vertical edges. On one side the joggle is inboard 141 and on the other side, outboard 144. When two halves are mated together to form the cylinder, the inboard and outboard joggles fit together in a complementary fashion. The edge 142 or 144 of one cylinder half interfaces with the joggle edge 141 or 143 of the other cylinder half. The depth of the joggles are approximately one-half the thickness of the cylinder walls. The result is that the outside surface of the cylinder at the seams is even. When the halves 140 and 145 are assembled together they form a complete cylinder large enough to fit the users hands or tools (see FIG. 4). The configuration of the device with two cylinder halves addresses several issues, mostly related to shipping, stocking, display on retailer shelves and transporting in the trucks of installers and lawn maintenance workers.

A top cap 120 and bottom cap 130 connect with the walls 140 and 145 once they are assembled together. The top cap 120 and bottom cap 130 have an exterior facing surface and an interior facing surface. The walls 140 and 145 fit into a channel which is formed on the interior facing surface of each of the caps. The channel is formed by two concentric upright walls 132 and 134 which run the circumference of the interior facing side at and near the outer perimeter. The body halves 145 and 140, once assembled together, fit into the channels formed by the two concentric upright walls 132 and 134 on the top 120 and bottom 130 caps. In one embodiment the walls 132 and 134 are the same height, while in the preferred embodiment the inner wall 134 is slightly higher than the outer wall 132. In another embodiment the top cap 120 is made of a clear plastic, or other transparent material, to allow for a better view when the sprinkler head is being screwed onto a riser or other type of connection with the underground pipe.

The top cap 120 has a hole which is either centrally located FIG. 4 or offset to one side see FIG. 5. The centrally located hole 125 has concentric punch-out circles providing the option of different hole sizes that will best accommodate the sprinkler head passing through it. The offset hole and its companion punch-out circles are not arranged concentrically FIG. 5, rather they are stacked 126 toward the outer edge of the top cap. The purpose of this arrangement is to assure that whichever size hole is chosen, the outside edge of the hole will be as close as possible to the outer edge of the cap. In looking at FIG. 4 it can be seen that there are two concentric punch out circles surrounding the hole 125 in the top cap 120. In this embodiment, shown in FIG. 4, there can therefore be three different sized holes depending on the need of the user.

The top cap has a dirt guard rim 127 extending outward and at a slight downward angle from the outer wall running the complete circumference. The purpose of the dirt guard is to prompt the user to clean dirt off of the top cap down to the dirt guard and to the outer edge of the rim prior to removing the top cap. When this is done, the dirt surrounding the enclosure device is well below vertically and at a distance laterally in relation to the top of the cylinder walls. This significantly helps to prevent dirt from falling into the working space chamber. There is a groove 128 that runs across the dirt guard in a position forward of the location of the offset holes. The purpose of the groove 128 is to facilitate breaking off the section of the guard in front of the offset holes. Removing this piece allows the enclosure to be placed as close as possible to sidewalks and driveways.

The bottom cap 130 incorporates the option of different hole sizes by way of concentric punch out or cut out holes to accommodate common but different forms of connection to the water supply pipes. In FIG. 3, the bottom cap 130 has two holes 135 and 137. One hole would be used for passage of a riser or other type of connection with the underground pipe; the unused hole is convenient as a drain hole. The offset hole, 137 is oblong rather than circular. The purpose of the oblong shape is that this hole has to be able to accommodate the three different center positions of each of the three offset stacked holes of the top cap. The position of the riser pipe passing through the offset hole of the bottom cap will shift depending upon which hole option of the offset group of the top cap is selected.

FIG. 4 displays an embodiment of the device with the sprinkler head hole placed in the center while FIG. 5 displays an embodiment of the device with the sprinkler head hole placed offset to one side of the top cap. It is beneficial to have an offset hole in circumstances where the sprinkler heads abut a curb or sidewalk. The multiple embodiments of the top cap 120 manufactured with holes placed at various locations allows this device to be used with sprinklers placed in different locations.

FIG. 6 displays a preferred embodiment of a top cap 120. In this oblique view of the interior side of the top cap the inner wall of a cap is scalloped 155. The scalloped inner wall 155 makes it easier to place the cap onto the cylinder when the repair is completed.

FIG. 7 A-D display in detail the punch out holes and how the same function. Referring to FIG. 7A is a graphical representation of a cross section FIG. 7B (160) of a portion of a top 120 or bottom 130 cap showing the configuration of the punch out holes. The thinner sections of material displayed at 161, 162, 163, 164 and 165 represent the scored punch-out circles. The user can determine the size hole they need and then press the surface of the cap, or alternatively use a knife to cut, at the thinner sections to punch out or cut out the hole.

Figure 7A:
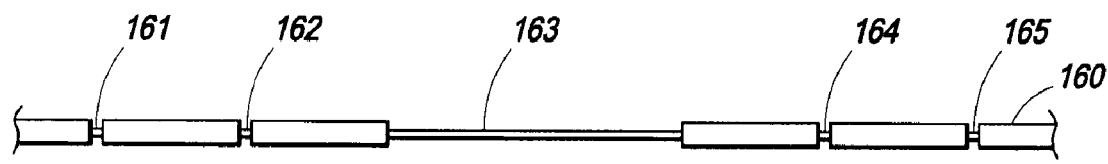
FIG. 7A is a graphical representation of a cross section of a portion of a working space enclosure cap showing the scored areas for the punch out holes.
Figure 7B:
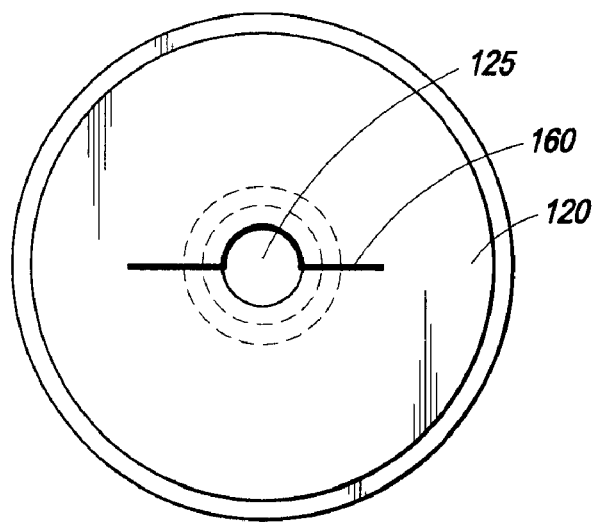
FIG. 7B is an aerial view of a top cap of the working space enclosure device with a center hole.
Figure 7C:
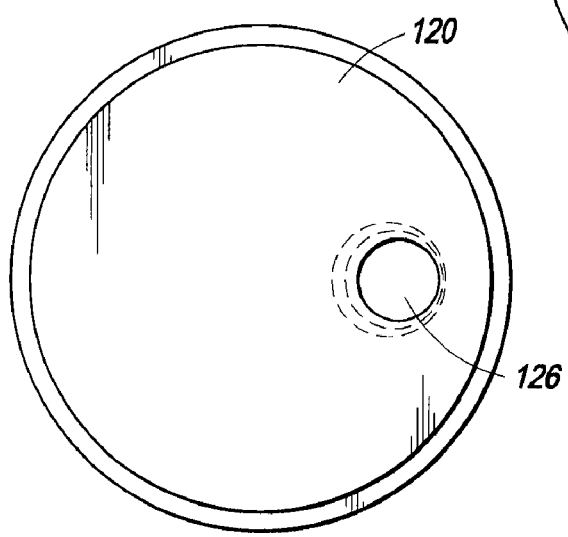
FIG. 7C is an aerial view of a top cap of the working space enclosure device with a offset hole.
Figure 7D:
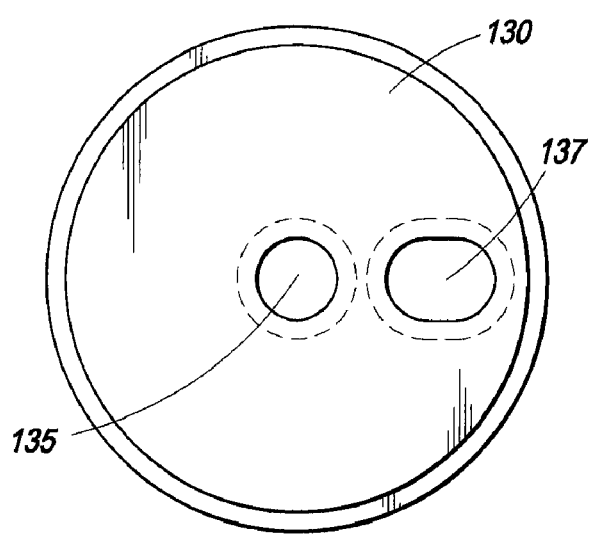
FIG. 7D is an aerial view of a bottom cap of the working space enclosure device.

FIG. 7B shows a top cap 120 with a center hole 125. The center hole 125 has one or more scored concentric circles. The hole can be punched or cut out at any of these circles once the user determines the size they need. The cross section shown at FIG. 7A is a view taken from FIG. 7B (160). FIG. 7C shows a top cap 120 with an offset hole 125. FIG. 7D is a bottom cap 130 showing both a center hole 135 and an oblong offset hole 137. Each of the holes have one or more punch-out possibilities from which to choose, depending upon the type of connection to the water supply.

Figure 8:
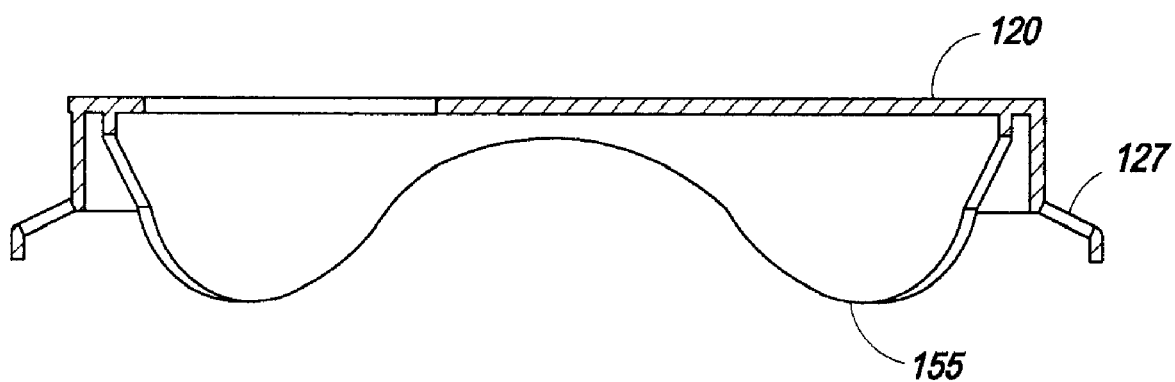
FIG. 8 is a cross sectional view of a top cap showing the scalloped edges and the dirt guard.

FIG. 8 is a cross sectional view of a top cap 120 showing the scalloped edges 155 and the dirt guard 127. The scalloped edges 155 make the top cap 120 easier to install, because it facilitates the positioning of the inner upright wall into the interior side of the cylinder while maintaining the outer wall on the exterior side of the cylinder. On this diagram the dirt guard 127 can be seen extending at a downward angle from the lower edge of the outer wall of the top cap 120. As explained in more detail above the dirt guard 127 helps to prevent dirt from falling into the working space chamber.

The above description of disclosed embodiments is provided to enable any person skilled in the art to make or use the invention. Various modifications to the embodiments will be readily apparent to those skilled in the art, the generic principals defined herein can be applied to other embodiments without departing from spirit or scope of the invention. Thus, the invention is not intended to be limited to the embodiments shown herein but is to be accorded the widest scope consistent with the principals and novel features disclosed herein.

The invention claimed is:

1. A sprinkler head and shaft housing which creates interior space around the shaft, comprising:
    a cylinder composed of two halves mated together at their edges to form a body with an upper and lower end;
    a top cap with an interior and exterior side, having two concentric upright walls running the entire circumference of the interior side of the cap forming a channel and one or more holes running through the cap to allow a sprinkler head or riser to pass through;
    a bottom cap with an interior and exterior side, having two concentric upright walls running the entire circumference of the interior side of the cap forming a channel and one or more holes running through the cap to allow a riser to pass through;
    wherein the upper end of the cylinder fits into the channel on the top cap and the lower end of the cylinder fits into the channel of the bottom cap and a sprinkler shaft or other pipe runs through the combination of the bottom cap, cylinder and top cap and the top of the sprinkler head sits outside the top cap of the housing.

2. The housing of claim 1, wherein the interior space around the sprinkler shaft is large enough to accommodate a person's hands or tools.

3. The housing of claim 1, which is manufactured from plastic.

4. The housing of claim 1, wherein the two halves are made from extruded lengths and can be cut to size.

5. The housing of claim 1, wherein the inner upright wall of the top and bottom cap is higher than the outer wall.

6. The housing of claim 1, wherein one of the upright walls of the top cap is scalloped.

7. The housing of claim 1, wherein the top cap is manufactured from a transparent material.

8. The housing of claim 1 including a dirt guard that extends laterally at a slight downward angle from the bottom of the upright wall which is closest to the outer edge of the top cap.

9. The housing of claim 8, wherein the dirt guard has a groove in which a section of the dirt guard can be broken away to allow the housing to be placed proximal to a sidewalk or other solid edge.

10. The housing of claim 1, wherein the one or more holes in the top and bottom cap have one or more concentric scored circles allowing holes to be punched or cut out at alternate locations.

11. A sprinkler protective housing device configured to fit around a sprinkler head, composed of:
    a body with an upper and lower open end comprised of two halves with joggle side edges mated together along their entire side edge to form a smooth wall;
    a top cap with an interior and exterior facing side, having two concentric upright walls running the entire circumference of the interior side of the cap forming a channel and one or more holes running through the cap;
    a bottom cap with an interior and exterior facing side, having two concentric upright walls running the entire circumference of the interior side of the cap forming a channel and one or more holes running through the cap;
    wherein the upper end of the cylinder fits into the channel on the top cap and the lower end of the cylinder fits into the channel of the bottom cap to form the device.

12. The device of claim 11, wherein the body is a length cut to fit the application.

13. The device of claim 11, wherein the body halves are made from extrusions of approximately four feet.

14. The device of claim 11, wherein there are scored lines running the entire horizontal circumference of the halves thus allowing portions of the body to be removed to reduce the size of the device.

15. The device of claim 11, wherein the joggle edge is one half the thickness of the wall of the halves.

16. The device of claim 11, wherein the one or more holes running through the top or bottom cap are offset and stacked toward an outer edge.

17. The device of claim 11, wherein the one or more holes is oblong.

* * * * *